Figure 1:
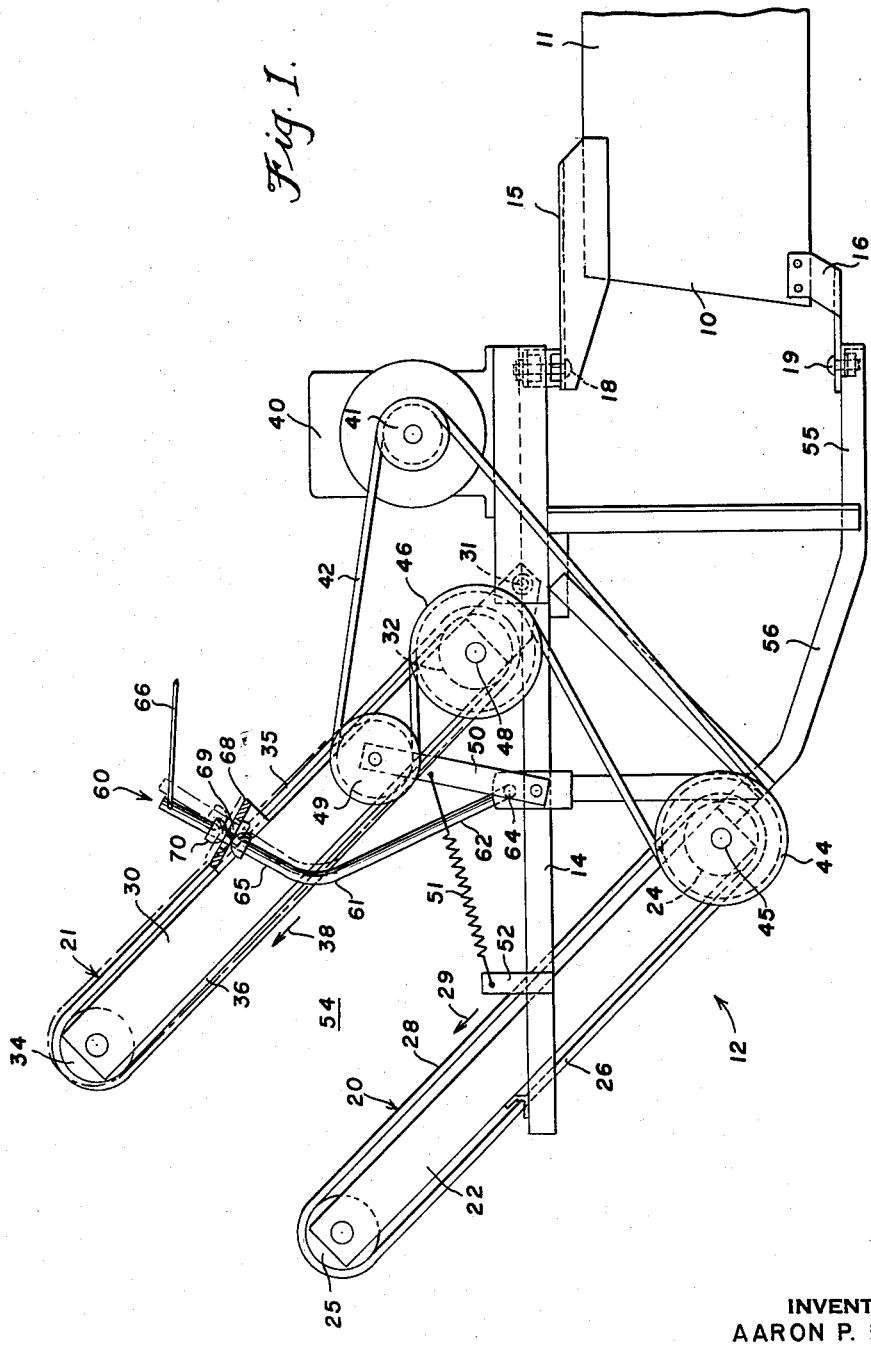

Dec. 17, 1963   A. P. BEILER   3,114,450
CONVEYING APPARATUS
Filed Sept. 19, 1962

INVENTOR
AARON P. BEILER
BY Joseph A. Brown
ATTORNEY

3,114,450
CONVEYING APPARATUS
Aaron P. Beiler, Blue Ball, Pa., assignor to Sperry Rand Corporation, New Holland, Pa., a corporation of Delaware
Filed Sept. 19, 1962, Ser. No. 224,662
8 Claims. (Cl. 198—128)

This invention relates to bale throwers attachable to the discharge end of the bale case of a baler to receive bales therefrom and to traject them to a trailing wagon. More particularly, the invention relates to an improvement in a bale thrower to allow variations in the distance a bale is trajected.

Heretofore, a bale thrower has been provided which comprises a pair of coextensive conveyors mounted one above the other and cooperatively operable to engage opposite sides of a bale and to traject the bale to a trailing wagon. The conveyors operate at high speed, having friction means which engages the surface of the bale to apply a throwing force thereto. A bale to be thrown is thrown by the progressive application of throwing force resulting from a sliding frictional engagement of the conveyors with the bale. Conventionally, the distance of bale trajectory is varied by varying the speed of the conveyors. The drive is from a gasoline engine whose throttle is controlled to increase or decrease the power output. While such speed control is effective in regulating the distance of bale trajectory, the increase and decrease in speed of motor operation produces some operative problems, the efficiency of the engine being higher if its speed is constant.

One object of this invention is to provide a bale thrower of the character described the engine of which operates at a constant speed, the thrower incorporating means for varying the distance of bale trajectory.

Another object of this invention is to provide bale thrower distance control means by which a bale may be trajected a long distance or a short distance as desired.

Another object of this invenion is to provide bale trajectory control means of the character described which is so constructed that the device is not overly sensitive to adjustments and achieves the desired trajectory control simply and effectively.

A further object of this invention is to provide a bale thrower structural arrangement which is simple and inexpensive, both to manufacture and assemble.

Other objects of this invention will be apparent hereinafter from the specification and from the recital in the appended claims.

In the drawing, FIG. 1 shows the discharge end of the bale case of a hay baler having mounted thereon a bale thrower in which is incorporated bale trajectory control means constructed according to this invention.

Referring now to the drawing by numerals of reference, 10 denotes the discharge end of a hay baler bale case 11. The baler, not shown, may be of any conventional construction and it will be understood that successive bales are discharged successively from bale case 11. Mounted on the bale case and adapted to receive the bales and traject them rearwardly of the baler is a bale thrower 12 comprising a frame 14 connected by brackets 15 and 16 to bale case 11. Vertically aligned pivot pins 18 and 19 are provided so that thrower 12 may swing laterally relative to bale case 11 whereby the direction in which bales are thrown may be changed.

For trajecting the bales, a pair of conveyors are provided, namely, lower conveyor 20 and upper conveyor 21. The lower conveyor comprises a frame structure 22 affixed to frame 14 and extending in an upward and rearward direction. Frame 22 rotatably carries a lower forward roller 24 and an upper rearward roller 25 around which an endless belt 26 extends. Belt 26 is of a width in the range of the width of the bales. It has an upper reach 28 which travels in the direction indicated by the arrow 29.

Upper conveyor 21 comprises a frame 30 pivotally supported at 31 on the thrower frame 14 whereby the upper conveyor may pivot about a transverse horizontal axis. Frame 30 has a lower forward roller 32 and an upper rearward roller 34 around which an endless belt 35 extends. Belt 35 is as wide as belt 26 and it has a lower reach 36 which travels in the direction indicated by the arrow 38.

Power is supplied to drive conveyors 21 and 22 at high speed from a gasoline engine 40 mounted on thrower frame 14. Engine 40 has an output sheave 41 which drives a narrow endless belt 42. Belt 42 extends around sheave 44 for driving the shaft 45 of the roller 24 and thus the endless belt 26 of lower conveyor 20. Belt 42 also extends around a sheave 46 drivingly connected to the shaft 48 of roller 32 of upper conveyor 21. A tightener sheave 49 is provided and carried on an arm 50 pivotally supported on frame 14 and spring biased by spring 51 to a tightening position. The spring 51 is interconnected between arm 50 and connecting member 52 of frame 14. When viewed as shown in FIG. 1, sheave 44 rotates in a counterclockwise direction while sheave 46 rotates clockwise. Thus, the upper reach 28 of conveyor 20 and the lower reach 36 of conveyor 21 travel in the same outward direction.

Between conveyors 20 and 21 is a space or passage 54 which is substantially the same as the space between the top and bottom of bale case 11. Thus, the conveyors are disposed for engagement with the top and bottom of each discharged bale. Each bale expands somewhat on leaving bale case 11 thereby further facilitating the subsequent engagement of the bale with the thrower conveyors. As each bale is discharged, it is deposited on support plate 55 which extends rearwardly from the bale case 11 and then upwardly at 56 to guide the bale toward the inlet end of passage 54 between conveyors 20 and 21. The bale first comes into contact with belt 26 and is lifted thereby into contact with belt 35. Both belts have suitable friction means such as rubber tread surfaces which engage the top and bottom faces of the bale and progressively impart a throwing force thereto. The belts slip relative to the bale surface until enough throwing force has been applied to the bale to produce its upward and rearward trajectory.

The above structure is conventional and provides the environment of the claimed improvement. To vary the distance a bale will be thrown, the upper conveyor 21 is supported for adjustable movement toward or away from lower conveyor 20. The distance a bale is thrown is determined by the force applied to it and such force is a function of the frictional engagement of the two conveyors with the bale. If upper conveyor 21 is in firm engagement with the top of the bale to be thrown, such bale will be trajected a substantial distance. However, if the upper conveyor is moved in a direction away from the lower conveyor and there is a resulting lessening of the frictional force upon the bale, then the distance of trajectory will be less. To achieve this end, frame 30 of conveyor 21 extends in a position about the pivotal connection 31 as established by control means 60. Control means 60 comprises a link 61 having a first section 62 pivotally connected at 64 to frame 14, and a second section 65 to which a rope 66 is connected. The first section 62 of the link extends upwardly and rearwardly while the second section 65 extends upwardly and forwardly. The second section extends through a bracket 68 having a fore-and-aft extending longitudinal slot 69. The link may be moved in a forward to rear direction within the limitations of the length of the slot 69 and the lost-motion connection thus provided. Above and below bracket 68 are curved bearing elements 70 which slidably engage bracket 68.

In FIG. 1, the upper conveyor 21 is shown in a lowered position wherein a trajected bale will travel a maximum distance relative to the capacity of the thrower. In such position, upper conveyor 21 has firm engagement with the top of each bale being thrown whereby a substantial throwing force is applied to the bale. However, if the operator wishes to throw a bale a lesser distance, he pulls rope 66 to pivot link 61 from the solid to the dotted position shown. When link 61 is so pivoted, it causes upper conveyor 21 to pivot about the connection 31 and to move to the dotted position. While the lower forward end of upper conveyor 21 remains in constant position relative to lower conveyor 20, the upper rearward end of the upper conveyor 21 is moved away from lower conveyor 20. Thus, when a bale is thrown, the application of throwing power is less than when the upper conveyor is in the position shown in solid lines. The increased slippage provided by the lighter frictional engagement of the belts 26 and 35 provides a bale trajectory which is shorter.

Thus, it will be seen that the distance a bale is trajected is controlled merely by pulling on the rope 66 or releasing such rope and thereby controlling the position of upper conveyor 21. The engine 40 runs at a constant speed with resulting optimum efficiency. No control means is required for the throttle of the engine to produce a variation in bale trajectory.

The structure described lends itself also to a bale thrower which derives its power from the baler rather than from a separate engine. In such case, no speed control means has to be provided in the drive train. The power drive to the thrower may be constant and the variations in bale trajectory may be achieved by pivoting one of the bale conveyors relative to the other.

The particular configuration of the control link 61 and the relative arrangement of the parts, provides for a relatively small pivoting movement of upper conveyor 21 responsive to a more substantial pivoting movement of the link 61. This renders the upper conveyor less sensitive to movement of the control link 61 and gives the operator better control of the trajectory.

While this invention has been described in connection with a particular embodiment thereof, it will be understood that it is capable of modification, and this application is intended to cover any variations, uses or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A bale thrower comprising a frame attachable to the discharge end of a bale case of a baler to receive bales therefrom, a lower conveyor on said frame and extending upwardly and rearwardly of the bale case, an upper conveyor coextensive and cooperative with the lower conveyor, means on said frame pivotally mounting the end of said upper conveyor adjacent said bale case for pivotal movement about a horizontal axis whereby the opposite end of the upper conveyor may be moved toward and away from said lower conveyor, said lower conveyor being engageable with the bottom and the upper conveyor the top of each bale, friction means on said conveyors and operative to apply a throwing force to each bale, a control link pivotally mounted on said frame, means connecting said control link to said upper conveyor, said control link when pivoted in one direction moving the upper conveyor toward the lower conveyor and when pivoted in the opposite direction moving the upper conveyor away from the lower conveyor, and means for pivoting said control link.

2. A bale thrower as recited in claim 1 wherein said control link has an upwardly and rearwardly extending first section and one upwardly and forwardly extending second section, said first section being connected to said frame for pivotal movement about a horizontal axis and said second section being connected to said upper conveyor.

3. A bale thrower as recited in claim 2 said means for connecting said control link to said upper conveyor includes lost-motion means.

4. A bale thrower as recited in claim 3 wherein said connecting means comprises a bracket on said upper conveyor and provided with a slot elongated in the direction of extension of the conveyor, said second section of said control link projecting through said slot, and bearing means on said second section and slidable on said bracket.

5. A bale thrower as recited in claim 4 wherein said bracket extends in a plane inclined relative to the extension of the upper conveyor.

6. A bale thrower as recited in claim 4 wherein said bearing means comprises a pair of curved elements on said second section of the control link and engageable with opposite sides respectively of said bracket.

7. A bale thrower as recited in claim 1 wherein said means for pivoting said control link comprises a rope connected to the link and manually useable.

8. A bale thrower comprising a frame attachable to the discharge end of a bale case of a baler to receive bales therefrom, a lower conveyor on said frame and extending upwardly and rearwardly of the bale case, an upper conveyor coextensive and cooperative with the lower conveyor, means on said frame pivotally mounting the end of said upper conveyor adjacent said bale case for pivotal movement about a horizontal axis whereby the opposite end of the upper conveyor may be moved toward and away from said lower conveyor, said lower conveyor being engageable with the bottom and the upper conveyor the top of each bale, friction means on said conveyors and operative to apply a throwing force to each bale, a control link mounted on said frame and movable relative thereto, means connecting said control link to said upper conveyor, said control link when moved in one direction moving the upper conveyor toward the lower conveyor and when moved in the opposite direction moving the upper conveyor away from the lower conveyor whereby the application of frictional throwing force applied to each bale may be increased and decreased as desired to thereby vary the distance of bale trajectory, and manually actuated means for moving said control link.

References Cited in the file of this patent
UNITED STATES PATENTS

| | | |
|---|---|---|
| 602,443 | Grigsby | Apr. 19, 1898 |
| 2,987,166 | Gray | June 6, 1961 |